United States Patent
Kawasoe et al.

(10) Patent No.: US 9,917,327 B2
(45) Date of Patent: Mar. 13, 2018

(54) NONAQUEOUS ELECTROLYTE SECONDARY BATTERY AND METHOD FOR PRODUCING NONAQUEOUS ELECTROLYTE SECONDARY BATTERY

(71) Applicant: GS Yuasa International Ltd., Kyoto (JP)

(72) Inventors: Yudai Kawasoe, Kyoto (JP); Katsushi Nishie, Kyoto (JP)

(73) Assignee: GS Yuasa International Ltd., Kyoto (JP)

( * ) Notice: Subject to any disclaimer, the term of this patent is extended or adjusted under 35 U.S.C. 154(b) by 107 days.

(21) Appl. No.: 14/361,545

(22) PCT Filed: Oct. 10, 2012

(86) PCT No.: PCT/JP2012/006494
§ 371 (c)(1),
(2) Date: May 29, 2014

(87) PCT Pub. No.: WO2013/084393
PCT Pub. Date: Jun. 13, 2013

(65) Prior Publication Data
US 2014/0335426 A1    Nov. 13, 2014

(30) Foreign Application Priority Data
Dec. 7, 2011  (JP) ................... 2011-267779

(51) Int. Cl.
| | | |
|---|---|---|
| *H01M 10/0567* | (2010.01) | |
| *H01M 4/58* | (2010.01) | |
| *H01M 10/0525* | (2010.01) | |
| *H01M 10/058* | (2010.01) | |
| *H01M 4/133* | (2010.01) | |
| *H01M 4/587* | (2010.01) | |

(52) U.S. Cl.
CPC ....... *H01M 10/0567* (2013.01); *H01M 4/133* (2013.01); *H01M 4/587* (2013.01); *H01M 4/5825* (2013.01); *H01M 10/058* (2013.01); *H01M 10/0525* (2013.01); *H01M 2300/004* (2013.01); *H01M 2300/0025* (2013.01); *Y02E 60/122* (2013.01); *Y02T 10/7011* (2013.01); *Y10T 29/49108* (2015.01)

(58) Field of Classification Search
CPC ......... H01M 10/0567; H01M 10/0525; H01M 10/058; H01M 4/5825; H01M 4/133; H01M 4/587; H01M 2300/0025; Y02E 60/122
See application file for complete search history.

(56) References Cited

U.S. PATENT DOCUMENTS

| | | | |
|---|---|---|---|
| 8,227,116 B2 | 7/2012 | Kawasaki et al. | |
| 8,357,471 B2 | 1/2013 | Utsugi et al. | |
| 8,445,144 B2 | 5/2013 | Utsugi et al. | |
| 9,306,238 B2 * | 4/2016 | Nishie | H01M 10/0567 |
| 2012/0052393 A1 | 3/2012 | Kameda et al. | |
| 2012/0141864 A1 | 6/2012 | Juzkow | |
| 2012/0244425 A1 * | 9/2012 | Tokuda | H01M 10/0567 429/199 |
| 2013/0040209 A1 | 2/2013 | Mio et al. | |
| 2013/0101895 A1 | 4/2013 | Utsugi et al. | |

FOREIGN PATENT DOCUMENTS

| | | |
|---|---|---|
| CN | 1922753 | 2/2007 |
| EP | 2768065 | 8/2014 |
| JP | 08-078052 | 3/1996 |
| JP | 2004-281325 A2 | 10/2004 |
| JP | 2004296106 A2 | 10/2004 |
| JP | 2005-135701 A2 | 5/2005 |
| JP | 2005-166553 A2 | 6/2005 |
| JP | 2005-285447 | 10/2005 |
| JP | 2006-156315 A2 | 6/2006 |
| JP | 2007-265858 A2 | 10/2007 |
| JP | 2008097894 A2 | 4/2008 |
| JP | 2009266813 A2 | 11/2009 |
| JP | 2010-050021 | 3/2010 |
| JP | 2010-135115 A2 | 6/2010 |
| JP | 2010-135305 | 6/2010 |
| JP | 2011-023330 A2 | 2/2011 |
| JP | 2011086391 A2 | 4/2011 |
| JP | 2011514639 | 5/2011 |
| WO | 2010110441 A1 | 9/2010 |
| WO | 2011/136189 A1 | 11/2011 |

OTHER PUBLICATIONS

International Search Report dated Jan. 15, 2013 filed in PCT/JP2012/006494.
Extended European Search Report dated Oct. 9, 2014 issued in the corresponding European patent application No. 12856071.1.

* cited by examiner

*Primary Examiner* — Laura Weiner
(74) *Attorney, Agent, or Firm* — Rankin, Hill & Clark LLP

(57) ABSTRACT

A nonaqueous electrolyte secondary battery includes a positive electrode, a negative electrode, and a nonaqueous electrolyte. A positive electrode charge potential is 3.7 V or less with respect to a lithium metal potential. The nonaqueous electrolyte includes a cyclic disulfone compound having a specific structure in an amount of 0.1 to 4.0% by mass based on a total mass of the nonaqueous electrolyte.

3 Claims, 1 Drawing Sheet

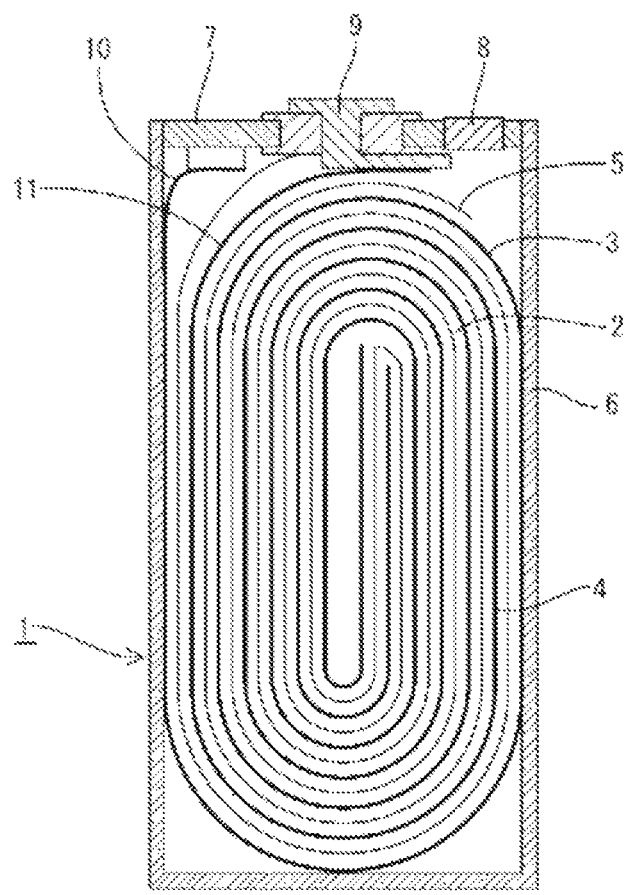

NONAQUEOUS ELECTROLYTE SECONDARY BATTERY AND METHOD FOR PRODUCING NONAQUEOUS ELECTROLYTE SECONDARY BATTERY

TECHNICAL FIELD

The present invention relates to a nonaqueous electrolyte secondary battery and a method for producing a nonaqueous electrolyte secondary battery.

BACKGROUND ART

Nonaqueous electrolyte secondary batteries such as lithium ion secondary batteries have a high energy density as compared to other secondary batteries such as lead-acid batteries and alkaline secondary batteries, and are therefore widely used as power sources of portable devices such as mobile phones. In recent years, research and development directed to use of a nonaqueous electrolyte secondary battery as a power source of a mobile body such as an electric car is being actively conducted.

While nonaqueous electrolyte secondary batteries such as lithium ion secondary batteries have a high energy density, they are expanded due to generation of gas therein as a result of repetition of charge-discharge and long-term storage. Such a phenomenon results mainly from generation of gas by a reaction between an electrode plate and a nonaqueous electrolyte, and attempts are made to add various additives to the nonaqueous electrolyte for suppressing the generation of gas. For example, Patent Document 1 describes a compound containing sulfur as an additive to a nonaqueous electrolyte.

PRIOR ART DOCUMENT

Patent Document

Patent Document 1: JP-A-2005-166553

SUMMARY OF THE INVENTION

Problems to be Solved by the Invention

Nonaqueous electrolyte secondary batteries mounted as power sources of mobile bodies such as electric cars and hybrid cars are used over a long period of time as compared to applications of conventional portable devices. When the mobile body is used in the summer season, the battery is used under a severe environment, for example, an environment in which the temperature of the battery may rise to a high temperature close to 60° C. depending on a location at which the battery is mounted. When the battery is used for a long period of time or under a severe environment as described above, decomposition of an electrolyte solution is accelerated, so that a large amount of gas is generated in the battery. Generation of gas in the battery causes the internal pressure of a battery case to be increased, leading to expansion of the battery. As a result, there are the problems that the battery mounting part of the mobile body is deformed to cause a failure, and that if the internal pressure is extremely increased, the safety mechanism of the battery is actuated, so that the battery no longer operates.

Means for Solving the Problems

As a result of extensively conducting studies on various additives to a nonaqueous electrolyte for solving the problems described above, it has been found that generation of gas in a battery when the battery is used under a high temperature for a long period of time can be considerably suppressed by adding to the nonaqueous electrolyte a cyclic disulfone compound having a specific structure while a positive electrode charge potential is set to 3.7 V or less with respect to a lithium metal potential.

The invention of the present application provides a nonaqueous electrolyte secondary battery including a positive electrode, a negative electrode and a nonaqueous electrolyte, wherein a positive electrode charge potential is 3.7 V or less with respect to a lithium metal potential, and the nonaqueous electrolyte includes a cyclic disulfone compound of the general formula (1) in an amount of 0.1 to 4.0% by mass based on the total mass of the nonaqueous electrolyte.

[Chemical Formula 1]

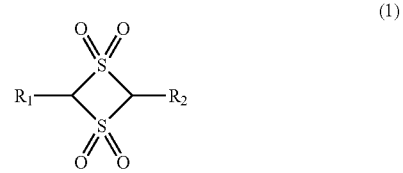

(1)

wherein R1 and R2 each represent hydrogen or an alkyl group having 2 to 4 carbon atoms, optionally including a halogen element.

According to the above-mentioned configuration, generation of gas in a battery when the battery is used under a high temperature for a long period of time can be suppressed.

In the battery according to the invention of the present application, preferably the positive electrode includes lithium iron phosphate. According to this configuration, the battery capacity can be enhanced because lithium iron phosphate has a high discharge capacity at a potential of 3.7 V or less with respect to a metal lithium potential.

In the battery according to the invention of the present application, preferably at least one of 2,4-diethyl-1,3-dithiethane-1,1,3,3-tetraone represented by the following formula (2), 2-(methylethyl)-1,3-dithiethane-1,1,3,3-tetraone represented by the following formula (3) and 2,4-bis(methylethyl)-1,3-dithiethane-1,1,3,3-tetraone represented by the following formula (4) is included as the cyclic disulfone compound.

[Chemical Formula 2]

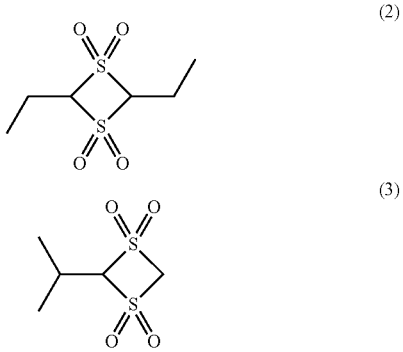

(2)

(3)

(4)

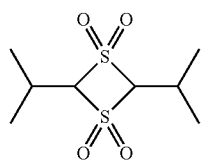

According to the above-mentioned configuration, generation of gas in a battery when the battery is used under a high temperature for a long period of time can be considerably suppressed.

In the battery according to the invention of the present application, preferably the negative electrode includes amorphous carbon having an average particle size of 2 to 25 μm or a carbon material with the surfaces of particles coated with amorphous carbon. According to this configuration, generation of gas in a battery can be considerably suppressed as compared to a case where graphite or the like is used for a negative electrode material.

The invention of the present application provides a method for producing a nonaqueous electrolyte secondary battery including a positive electrode, a negative electrode and a nonaqueous electrolyte, wherein a positive electrode charge potential is 3.7 V or less with respect to a lithium metal potential, and the nonaqueous electrolyte includes a cyclic disulfone compound of the general formula (1) in an amount of 0.1 to 4.0% by mass based on the total mass of the nonaqueous electrolyte.

BRIEF DESCRIPTION OF THE DRAWING

FIG. 1 is a sectional view of a nonaqueous electrolyte secondary battery of embodiment 1.

MODE FOR CARRYING OUT THE INVENTION

Embodiments of the present invention will be explained in detail below, but the explanation described below presents one example of embodiments of the present invention, and the present invention is not limited to the content of these embodiments as long as not exceeding the spirit thereof.

Embodiment 1 of the present invention will be explained with reference to FIG. 1. A nonaqueous electrolyte secondary battery (hereinafter, referred to as a "secondary battery") shown in FIG. 1 includes a power generating element in which a positive electrode plate with a positive composite, which contains a positive active material, applied to both surfaces of a positive electrode current collector formed of an aluminum foil or an aluminum alloy foil and a negative electrode plate with a negative composite, which contains a negative active material, applied to both surfaces of a negative electrode current collector formed of a copper foil are wound with a separator interposed therebetween, the power generating element being accommodated in a battery case.

The positive electrode plate is connected to a battery lid via a positive electrode lead, the negative electrode plate is connected to a negative electrode terminal provided on the battery lid, and the battery lid is attached by laser welding so as to doe an opening of the battery case. The battery case is provided with a hole, a nonaqueous electrolyte is injected into the battery case through the hole, and after the nonaqueous electrolyte is injected, the hole is sealed to obtain a nonaqueous electrolyte secondary battery.

For the nonaqueous electrolyte of the present invention, a solution of an electrolyte salt in a nonaqueous solvent, is used. Examples of the electrolyte salt include $LiClO_4$, $LiPF_6$, $LiBF_4$ and $LiAsF_6$, and these electrolyte salts may be used alone or as a mixture of two or more thereof. $LiPF_6$ is preferred as the electrolyte salt from the viewpoint of conductivity, and a mixture of $LiPF_6$ as a main component of the electrolyte salt and other electrolyte salts such as $LiBF_4$ can also be used.

As the nonaqueous solvent, of the nonaqueous electrolyte, ethylene carbonate, propylene carbonate, butylene carbonate, trifluoropropylene carbonate, γ-butyrolactone, dimethyl carbonate, diethyl carbonate, ethyl methyl carbonate and the like can be used. Preferably these nonaqueous solvents are mixed and used from the viewpoint of adjusting the conductivity and viscosity of the nonaqueous electrolyte.

The nonaqueous electrolyte of the present invention includes a cyclic disulfone compound of the following general formula (1) in an amount of 0.1 to 4.0% by mass based on the total mass of the nonaqueous electrolyte. Here, R1 and R2 each represent an alkyl group having 2 to 4 carbon atoms, optionally including a halogen element, or hydrogen.

[Chemical Formula 3]

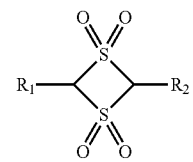

(1)

Specific examples of the compound represented by the general formula (1) include 2-ethyl-1,3-dithiethane-1,1,3,3-tetraone, 2,4-diethyl-1,3-dithiethane-1,1,3,3-tetraone, 2-propyl-1,3-dithiethane-1,1,3,3-tetraone, 2,4-dipropyl-1,3-dithiethane-1,1,3,3-tetraone, 2-butyl-1,3-dithiethane-1,1,3,3-tetraone and 2,4-dibutyl-1,3-dithiethane-1,1,3,3-tetraone, and among them, 2,4-diethyl-1,3-dithiethane-1,1,3,3-tetraone represented by the following formula (2), 2-(methylethyl)-1,3-dithiethane-1,1,3,3-tetraone represented by the following formula (3) and 2,4-bis(methylethyl)-1,3-dithiethane-1,1,3,3-tetraone represented by the following formula (4) are preferably selected. These compounds can be mixed and added to the nonaqueous electrolyte.

[Chemical Formula 4]

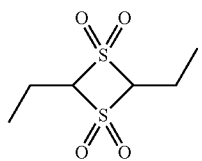

(2)

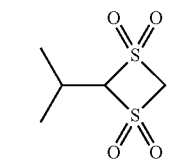

(3)

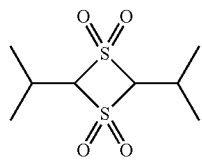

(4)

A positive electrode charge potential of the secondary battery of the present invention is 3.7 V or less with respect to a lithium metal potential, and the battery includes in a nonaqueous electrolyte the cyclic disulfone compound represented by the aforementioned general formula (1), so that generation of gas in the battery when the battery is used under a high temperature for a long period of time can be suppressed. Details of the mechanism with which the aforementioned effect is exhibited are not evident, but it is thought that in the initial stage of use of the battery (during several times of charge-discharge just after completion of the battery), the cyclic disulfone compound is decomposed on the electrode to generate a protective film. That is it is thought that by setting the charge potential of the positive electrode to 3.7 V or less with respect to the lithium metal potential, the cyclic disulfone compound is inhibited from being oxidatively decomposed on the positive electrode, and is mainly reductively decomposed on the negative electrode, so that a strong and stable protective film is generated on the surface of the negative electrode. Owing to generation of the protective film, a solvent of the nonaqueous electrolyte and a negative electrode material may be inhibited from reacting with each other even when the battery is used under a high temperature for a long period of time, so that the gas generation amount can be reduced. R1 and R2 in the general formula (1) each represent an alkyl group having 2 to 4 carbon atoms, optionally including a halogen element, or hydrogen. When the number of carbon atoms is 1, the cyclic disulfone compound is hard to be dissolved in the nonaqueous electrolyte, and when the number of carbon atoms is 5 or more, synthesis is difficult.

The battery voltage is generally a difference between a positive electrode potential and a negative electrode potential, and therefore the positive electrode charge potential is calculated by addition of a negative electrode charge potential to a battery charge voltage. The negative electrode charge potential is a potential with respect to a lithium metal, and is determined from a single-electrode battery using a lithium metal as a counter electrode. The phrase "the positive electrode charge potential is 3.7 V or less with respect to a lithium metal potential" means that the positive electrode potential calculated from a battery charge voltage and a negative electrode charge potential is 3.7 V or less. When the charge termination voltage of the battery in a battery charger is set high, the positive electrode charge potential may be 3.7 or more. Even in this case, as long as a capacity at which the positive electrode, charge potential is 3.7 V or more is 5% or less of the capacity of the total charge region, there is no influence on the effect of the present invention, and thus the effect of the present invention can be obtained. The positive electrode charge potential can be controlled by adjusting the charge voltage, of the battery. The positive electrode charge potential is usually 2.5 V or more.

The amount of the cyclic disulfone compound of the general formula (1) is 4.0% by mass or less based on the total mass of the nonaqueous electrolyte. When the amount of the cyclic disulfone compound is more than 4.0% by mass, the cyclic disulfone compound and the negative electrode material excessively react with each other, so that a large amount of gas is generated as the cyclic disulfone compound is decomposed. On the other hand, when the amount of the cyclic disulfone compound is excessively small, the reaction with the negative electrode material is insufficient, so that a strong protective film cannot be generated. Therefore, the amount of the cyclic disulfone compound is 0.1% by mass or more based on the total mass of the nonaqueous electrolyte. For generating a proper protective film on the surfaces of particles of the negative electrode material by a reaction of the cyclic disulfone compound and the negative electrode material, the amount of the cyclic disulfone compound based on the total mass of the nonaqueous electrolyte is preferably 0.1% by mass or more and 4.0% by mass or less, more preferably 0.2% by mass or more and 2.0% by mass or less.

In addition to the compound described above, carbonates such as vinylene carbonate, methylvinylene carbonate, monaluoroethylene carbonate and difluoroethylene carbonate can be added alone or as a mixture of two or more thereof to the nonaqueous electrolyte for the purpose of improving cycle life performance and safety of the battery.

Preferably a positive active material of the secondary battery of the present invention includes lithium iron phosphate. Lithium iron phosphate has a high charge-discharge capacity at a potential of 3.7 V or less with respect to a metal lithium potential, and therefore when the positive active material includes lithium iron phosphate, the battery capacity can be enhanced. Lithium iron phosphate in the present invention has a chemical composition represented by the general formula: $Li_xFe_{1-y}M1_y(PO_4)_z$ (M1 is at least one element selected from transition metal elements; and x is 0.85 to 1.10, y is 0 to 1 and z is 0.95 to 1.05). Preferably carbon is carried on the surfaces of lithium iron phosphate particles.

The positive active material of the secondary battery of the present invention may include two or more positive active materials. Specifically, a mixture of lithium iron phosphate and a different positive active material other than lithium iron phosphate can be used. As the positive active material that can be mixed with lithium iron phosphate, for example, $LiM2O_2$ having a layered rock salt structure, $LiM3_2O_4$ having a spinel structure, or the like can be used (each of M2 and M3 is at least one element selected from transition metal elements).

In addition to the positive active material, a conducting agent, a binder and so on can be contained in the positive electrode plate of the secondary battery of the present invention. As the conducting agent, acetylene black, carbon black, graphite, and the like may be used. As the binder, polyvinylidene fluoride, a vinylidene fluoride-hexafluoropropylene copolymer, a at rubber, polyacrylonitrile, and the like may be used alone or as a mixture of two or more thereof.

As a negative active material of the secondary battery of the present invention, a carbon material, an alloy-based compound of Al, Si, Pb, Sn, Zn, Cd or the like and lithium, metal lithium, and a metal oxide represented by the general formula M4Oz (where M4 represents at least one element selected from W, Mo, Si, Cu and Sn, and $0 \leq z \leq 2$) or the like may be used. Examples of the carbon material include amorphous carbon such as hardly graphitizable carbon (hard carbon) and easily graphitizable carbon (soft carbon), and graphite. Amorphous carbon is a carbon material in which the growth level of the hexagonal network structure is lower than that of graphite. Amorphous carbon in the present invention has a spacing on the (002) plane of 3.45 angstroms or more as measured by X-ray wide angle diffractometry in a discharged state.

Preferably the negative active material of the secondary battery of the present invention contains amorphous carbon. Since amorphous carbon has low reactivity with the cyclic disulfone compound as compared to graphite, excessive reaction of the cyclic disulfone compound is prevented in the initial stage of use of the battery (during several times of charge-discharge just after completion of the battery), so that a protective film having a preferred thickness can be generated. Therefore, when the negative active material contains amorphous carbon, generation of gas in the battery can be suppressed. The negative active material of the secondary battery of the present invention may be a mixture of both amorphous carbon and graphite, or may contain only amorphous carbon.

The negative active material of the secondary battery of the present invention may include particles having amorphous carbon on the surfaces thereof, and examples thereof include particles with the surfaces of graphite particles coated with amorphous carbon. Examples of the method for coating graphite particles with amorphous carbon include a method in which amorphous carbon is rubbed against graphite particles, a method in which graphite particles are coated with amorphous carbon by a mechanochemical method, and a method in which graphite particles are coated with amorphous carbon by a chemical vapor deposition (CVD) method.

The negative active material of the secondary battery of the present invention is preferably amorphous carbon having an average particle size of 2 to 25 µm. When the average particle size falls within the above-described range, the cyclic disulfone compound and the surfaces of particles of the negative active material properly react with each other, so that a protective film having a preferred thickness can be generated on the negative electrode, and generation of gas in the battery can be suppressed. The average particle size of amorphous carbon can be adjusted by, for example, classifying amorphous carbon ground into a particle shape.

Here, the abovementioned average particle size is a particle size at a cumulative degree of 50% ($D_{50}$) in the volume standard particle size distribution. For measurement of the particle size distribution, a laser diffraction/scattering type particle size distribution measurement apparatus (SALD-2000J manufactured by Shimadzu Corporation) was used. In preparation for measurement, X and Y axes in a laser section of the measurement apparatus were adjusted to perform centering of a detector. The abovementioned active material prepared as described above and an anionic surfactant having a linear sodium alkylbenzene sulfonate as a main component were sufficiently mixed, and ion-exchange water was then added to prepare a measurement sample. In measurement of the measurement sample, blank measurement was performed with only a dispersion solvent (water in this Example) circulated to a measurement section, thereby acquiring background data. Next, the measurement sample was put in the measurement section of the measurement apparatus, and ultrasonic irradiation was performed in the measurement section for 15 minutes. After ultrasonic irradiation was performed, the particle size of the measurement sample was measured twice, and an average thereof was acquired as a measurement result. As the measurement result, a particle size distribution histogram, and the respective values of $D_{10}$, $D_{50}$ and $D_{90}$ ($D_{10}$, $D_{50}$ and $D_{90}$ were particle sizes at which the cumulative volumes in the particle size distribution of secondary particles were 10%, 50% and 90%, respectively) were acquired.

A separator 5 may be one that can electrically isolate the positive electrode plate and the negative electrode plate from each other, and a nonwoven fabric, a synthetic resin microporous film, or the like may be used. Particularly, a synthetic resin microporous film is preferred from the viewpoint of proccessability and durability, and particularly a polyolefin-based microporous film formed of polyethylene and polypropylene, a heat-resistant resin including an aramid layer on the surface of the polyolefin-based microporous film, or the like may be used.

EXAMPLES

A secondary battery shown in FIG. 1 was produced in the following, manner.

1. Preparation of Secondary Battery of Example 1

(1) Production of Positive Electrode Plate

An iron powder, ammonium dihydrogen phosphate and lithium carbonate were weighed so as to have to molar ratio of 2:2:1, and mixed. Ethanol as a solvent was then added, and the mixture was wet-ground/mixed by a ball mill for 2 hours to obtain a raw material mixed powder. The raw material mixed powder was fired under a reducing atmosphere at 700° C. for 5 hours, and further ground to obtain particle-shaped carbon-coated lithium iron phosphate. The obtained carbon-coated lithium iron phosphate, acetylene black as a conductive additive and polyvinylidene fluoride as a binder were mixed in ratios of 90% by mass, 5% by mass and 5% by mass, respectively, and an appropriate amount of NMP (N-methylpyrrolidone) was added to the mixture to adjust the viscosity, thereby preparing a positive composite paste. The positive composite paste was applied to both surfaces of an aluminum foil having a, thickness of 20 µm, and dried to prepare a positive electrode plate. The positive electrode plate was provided, with an area where the positive composite was not applied and the aluminum foil was exposed, and an area where the aluminum foil was exposed and a positive electrode lead were connected to each other.

(2) Production of Negative Electrode Plate

As a negative active material, hardly graphitizable carbon adjusted to an average particle size of 15 µm by classification or the like and having a spacing (d002) of 3.79 angstroms was used. A negative composite paste was prepared such that the hardly graphitizable carbon and polyvinylidene fluoride as a binder were mixed in ratios of 90% by mass and 10% by mass, respectively, and NNW was added to the mixture to adjust the viscosity. The negative composite paste was applied to both surfaces of a copper foil having a thickness of 15 µm, and dried, to prepare a negative electrode plate. The negative electrode plate was provided with an area where the negative composite was not applied and the copper foil was exposed, and an at ea where the copper foil was exposed and a negative electrode lead were connected to each other.

(3) Preparation of Unfilled Secondary Battery

A separator formed of a polyethylene microporous film, was interposed between the positive electrode plate and the negative electrode plate, and the positive electrode plate and the negative electrode plate were wound to prepare a power generating element. The power generating element was accommodated in a battery case through an opening of the battery case. The positive electrode lead was connected to the battery lid. The negative electrode lead was connected to the negative electrode terminal. The battery case and the battery lid were then bonded to each other by laser welding with the battery lid fitted in the opening of the battery case, thereby preparing a secondary battery in an unfilled state where the battery case was not filled with the nonaqueous electrolyte.

(4) Preparation and Filling of Nonaqueous Electrolyte

A nonaqueous electrolyte was prepared by dissolving $LiPF_6$ at a concentration of 1 mol in a mixed solvent of ethylene carbonate (EC):dimethyl carbonate (DMC):ethyl methyl carbonate (EMC)=3:2:5 (volume ratio), and adding 2,4-diethyl-1,3-dithiethane-1,1,3,3-tetraone such that the addition amount of the cyclic sulfone compound was 1.0% by mass based on the total mass of the nonaqueous electrolyte. The nonaqueous electrolyte was filled into the battery case through an electrolyte solution filling port provided at the side surface of the battery case, and the electrolyte solution filling port was sealed with a cap to prepare a secondary battery of Example 1.

2. Preparation of Secondary Batteries of Example 2 and Comparative Examples 1 and 2

Batteries of Example 2 and Comparative Examples 1 and 2 were prepared in the same manner as in the case of the battery of Example 1 except that carbon-coated lithium iron phosphate as the positive active material included in the positive electrode in Example 1 was changed to lithium cobalt oxide or spinel type lithium manganese oxide. Lithium cobalt oxide and spinel type lithium manganese oxide used in the present experimental examples were prepared by a general synthesis method. That is, lithium cobalt Oxide was obtained by dry-mixing cobalt: oxide and lithium carbonate in a predetermined ratio, and firing the mixture in the air at 700° C. for 10 hours. Spinel type lithium manganese oxide was obtained by dry-mixing lithium hydroxide and manganese dioxide in a predetermined ratio, and firing the mixture in the air at 900° C. for 8 hours.

3. Preparation of Secondary Batteries of Examples 3 to 7 and Comparative Examples 3 and 4

Batteries of Examples 3 to 7 and Comparative Examples 3 and 4 were prepared in the same manner as in the case of the battery of Example 1 except that the addition amount of 2,4-diethyl-1,3-dithiethane-1,1,3,3-tetraone in Example 1 was changed to 0.1% by mass, 0.2% by mass, 0.5% by mass, 2.0% by mass, 4.0% by mass, 0.0% by mass and 5.0% by mass, respectively.

4. Preparation of Secondary Batteries of Examples 8 to 11 and Comparative Example 5

Batteries of Examples 8 to 11 and Comparative Example 5 were prepared in the same manner as in the case of the battery of Example 1 except that 2,4-diethyl-1,3-dithiethane-1,1,3,3-tetraone in Example 1 was changed to 2-(methylethyl)-1,3-dithiethane-1,1,3,3-tetraone, 2,4-bis(methylethyl)-1,3-dithiethane-1,1,3,3-tetraone, 2-butyl-1,3-dithiethane-1,1,3,3-tetraone, 2,4-bis(butyl)-1,3-dithiethane-1,1,3,3-tetraone and 2,4-dimethyl-1,3-dithiethane-1,1,3,3-tetraone, respectively.

5. Preparation of Secondary Batteries of Examples 12 to 18

Batteries of Examples 12 to 18 were prepared in the same manner as in the case of the battery of Example 1 except that hardly graphitizable carbon having an average particle size of 1.5 μm as the negative active material included in the negative electrode in Example 1 was changed to hardly graphitizable carbon having an average particle, size of 1, 2, 25 and 27 μm (Examples 12 to 15), hardly graphitizable carbon-coated graphite having an average particle size of 19 μm (Example 16), natural graphite having an average particle size of 10 μm (Example 17), and a mixture of the natural graphite and the hardly graphitizable carbon-coated graphite. (Example 18), respectively. Hardly graphitizable carbon-coated graphite used as the negative active material in Examples 16 and 18 was formed by coating graphite particles with hardly graphitizable carbon by a CVD method, i.e., coating the surface of the graphite with the hardly graphitizable carbon in an amount of about 5% based on the total mass of the graphite particles. Natural graphite used as the negative active material in Examples 17 and 18 was uncoated general natural graphite. The mixture of natural graphite and hardly graphitizable carbon-coated graphite in Example 18 was formed by mixing natural graphite and hardly graphitizable carbon-coated graphite in a mass ratio of 40:60.

6. Evaluation Test (1) Measurement of Potential of Negative Electrode

A potential with respect to a lithium metal potential in the negative electrode used in each battery was measured in the following manner. That is, using a three-electrode beaker cell, each negative electrode was attached to a working electrode, a lithium metal was attached to a counter electrode and a reference electrode, and an electrolyte was added. As the electrolyte, one obtained by dissolving $LiClO_4$ in a mixed solvent of ethylene carbonate (EC):dimethyl carbonate (DMC)=5:5 (volume ratio) so as to have a final concentration of 1 mol/L was used. Each beaker cell was subjected to constant current constant voltage charge under the conditions of a temperature of 25° C., a current density of 0.5 mA/cm$^2$, a charge voltage of 0.02 V, a charge time of 24 hours and a termination current of 0.05 mA, and a change in potential with respect to a lithium metal potential of the negative electrode used for each battery was measured. In the change in potential, a charge region having a potential of 1.0 V or less with respect to a metal lithium potential had a region in which a change in potential was relatively small, and an arithmetic mean of potentials in the region was employed as a "charge potential of negative electrode". As a result, the "charge potential of negative electrode" of hardly graphitizable carbon used in Examples 1 to 15 and Comparative Examples 1 to 5 was 0.15 V. The "charge potential of negative electrode" of natural graphite and hardly graphitizable carbon-coated graphite used in Examples 16 to 18 was 0.1 V.

(2) 60° C. Cycle Life Test

The battery was charged for 3 hours in total such that the battery was charged to a predetermined voltage at a constant current of 450 mA, and then charged at a constant voltage. The predetermined voltage was calculated based on the "charge potential of negative electrode" measured in advance so as to obtain the charge potential of the positive electrode described in Table 1. That is, in Examples 1 to 15 and Comparative Examples 3 to 5, the predetermined voltage was 3.55 V. In Examples 16 to 18, the predetermined voltage, was 3.60 V. In Comparative Examples 1 and 2, the predetermined voltage was 4.15 V After being charged, each battery was discharged to a termination voltage of 2.6 V at a constant current of 450 mA. This charge-discharge was repeated 2000 cycles in a thermostatic bath at 60° C.

(3) Measurement of Gas Generation Amount

A hole was opened in a battery case while each battery before and after the 60° C. cycle life test was submerged in liquid paraffin, and bubbles of gas released were recovered in a container in liquid paraffin. Gas in the container was drawn out using a syringe with a scale, and an amount of gas was observed with the scale of the syringe. A value obtained by subtracting the amount of as in the battery before the test from the amount of gas in the battery after the test was defined as a "gas generation amount".

7. Discussions

The gas generation amounts in Examples 1 to 18 and Comparative Examples 1 and 5 are shown in Table 1.

TABLE 1

| | Change potential of positive electrode (V vs. Li/Li$^+$) | Positive active material | Negative active material 1 | Particle size of negative active material 1 (μm) | Negative active material 2 | Particle size of negative active material 2 (μm) | Cyclic disulfone compound | Addition amount of cyclic disulfone compound (% by mass) | Gas generation amount (mL) |
|---|---|---|---|---|---|---|---|---|---|
| Example 1 | 3.7 | Lithium iron phosphate | Hardly graphitizable carbon | 15 | None | None | 2,4-diethyl-1,3-dithiethane-1,1,3,3-tetraone | 1.0 | 2.3 |
| Example 2 | 3.7 | Lithium cobalt oxide | Hardly graphitizable carbon | 15 | None | None | 2,4-diethyl-1,3-dithiethane-1,1,3,3-tetraone | 1.0 | 3.0 |
| Comparative Example 1 | 4.3 | Lithium cobalt oxide | Hardly graphitizable carbon | 15 | None | None | 2,4-diethyl-1,3-dithiethane-1,1,3,3-tetraone | 1.0 | 9.2 |
| Comparative Example 2 | 4.3 | Spinel type manganese oxide lithium | Hardly graphitizable carbon | 15 | None | None | 2,4-diethyl-1,3-dithiethane-1,1,3,3-tetraone | 1.0 | 9.1 |
| Comparative Example 3 | 3.7 | Lithium iron phosphate | Hardly graphitizable carbon | 15 | None | None | None | — | 8.0 |
| Example 3 | 3.7 | Lithium iron phosphate | Hardly graphitizable carbon | 15 | None | None | 2,4-diethyl-1,3-dithiethane-1,1,3,3-tetraone | 0.1 | 5.8 |
| Example 4 | 3.7 | Lithium iron phosphate | Hardly graphitizable carbon | 15 | None | None | 2,4-diethyl-1,3-dithiethane-1,1,3,3-tetraone | 0.2 | 4.0 |
| Example 5 | 3.7 | Lithium iron phosphate | Hardly graphitizable carbon | 15 | None | None | 2,4-diethyl-1,3-dithiethane-1,1,3,3-tetraone | 0.5 | 2.4 |
| Example 6 | 3.7 | Lithium iron phosphate | Hardly graphitizable carbon | 15 | None | None | 2,4-diethyl-1,3-dithiethane-1,1,3,3-tetraone | 2.0 | 2.7 |
| Example 7 | 3.7 | Lithium iron phosphate | Hardly graphitizable carbon | 15 | None | None | 2,4-diethyl-1,3-dithiethane-1,1,3,3-tetraone | 4.0 | 4.9 |
| Comparative Example 4 | 3.7 | Lithium iron phosphate | Hardly graphitizable carbon | 15 | None | None | 2,4-diethyl-1,3-dithiethane-1,1,3,3-tetraone | 5.0 | 7.4 |
| Comparative Example 5 | 3.7 | Lithium iron phosphate | Hardly graphitizable carbon | 15 | None | None | 2,4-diethyl-1,3-dithiethane-1,1,3,3-tetraone | 1.0 | 8.2 |
| Example 8 | 3.7 | Lithium iron phosphate | Hardly graphitizable carbon | 15 | None | None | 2-(methylethyl)-1,3-dithiethane-1,1,3,3-tetraone | 1.0 | 2.5 |
| Example 9 | 3.7 | Lithium iron phosphate | Hardly graphitizable carbon | 15 | None | None | 2,4-bis(methylethyl)-1,3-dithiethane-1,1,3,3-tetraone | 1.0 | 2.6 |
| Example 10 | 3.7 | Lithium iron phosphate | Hardly graphitizable carbon | 15 | None | None | 2-butyl-1,3-dithiethane-1,1,3,3-tetraone | 1.0 | 3.0 |
| Example 11 | 3.7 | Lithium iron phosphate | Hardly graphitizable carbon | 15 | None | None | 2,4-bis(butyl)-1,3-dithiethane-1,1,3,3-tetraone | 1.0 | 3.2 |
| Example 12 | 3.7 | Lithium iron phosphate | Hardly graphitizable carbon | 1 | None | None | 2,4-diethyl-1,3-dithiethane-1,1,3,3-tetraone | 1.0 | 5.1 |
| Example 13 | 3.7 | Lithium iron phosphate | Hardly graphitizable carbon | 2 | None | None | 2,4-diethyl-1,3-dithiethane-1,1,3,3-tetraone | 1.0 | 3.9 |
| Example 14 | 3.7 | Lithium iron phosphate | Hardly graphitizable carbon | 25 | None | None | 2,4-diethyl-1,3-dithiethane-1,1,3,3-tetraone | 1.0 | 3.6 |

TABLE 1-continued

| | Change potential of positive electrode (V vs. Li/Li+) | Positive active material | Negative active material 1 | Particle size of negative active material 1 (μm) | Negative active material 2 | Particle size of negative active material 2 (μm) | Cyclic disulfone compound | Addition amount of cyclic disulfone compound (% by mass) | Gas generation amount (mL) |
|---|---|---|---|---|---|---|---|---|---|
| Example 15 | 3.7 | Lithium iron phosphate | Hardly graphitizable carbon | 27 | None | None | 2,4-diethyl-1,3-dithiethane-1,1,3,3-tetraone | 1.0 | 4.8 |
| Example 16 | 3.7 | Lithium iron phosphate | Hardly graphitizable carborrcoated graphite | 19 | None | None | 2,4-diethyl-1,3-dithiethane-1,1,3,3-tetraone | 1.0 | 3.8 |
| Example 17 | 3.7 | Lithium iron phosphate | Natural graphite | 10 | None | None | 2,4-diethyl-1,3-dithiethane-1,1,3,3-tetraone | 1.0 | 5.2 |
| Example 18 | 3.7 | Lithium iron phosphate | Natural graphite | 10 | Hardly graphitizable carbon-coated graphite | 19 | 2,4-diethyl-1,3-dithiethane-1,1,3,3-tetraone | 1.0 | 4.3 |

In the batteries in which the positive electrode charge potential is 3.7 V or less with respect to a lithium metal potential, and the nonaqueous electrolyte includes a cyclic disulfone compound of the aforementioned general formula (1) (Examples 1 and 2), satisfactory results were obtained with the gas generation amount being smaller than 6.0 mL. On the other hand, in the batteries in which the positive electrode charge potential is 3.7 V or more with respect to a lithium metal potential (Comparative Examples 1 and 2), the gas generation amount was larger than 6.0 mL. The charge-discharge capacity during the life test in the batteries using a positive electrode including lithium iron phosphate (Examples 1 and 3 to 18) was about 450 mAh, a value almost consistent with a design capacity. On the other hand, in the battery using a positive electrode including lithium cobalt oxide (Example 2), the charge-discharge capacity during the life test was about 45 mAh, a value equivalent to about 10% of the design capacity as a result of setting the charge potential of the positive electrode to 3.7 V or less. Thus, when a positive electrode including lithium iron phosphate is used, the energy density can be further increased.

In the batteries with 2,4-diethyl-1,3-dithiethane-1,1,3,3-tetraone added as a cyclic disulfone compound in an amount of 0.1 to 4.0% by mass based on the total mass of the nonaqueous electrolyte (Examples 3 to 7), satisfactory results were obtained with the gas generation amount being smaller than 6.0 mL. Particularly, in the batteries with 2,4-diethyl-1,3-dithiethane-1,1,3,3-tetraone added in an amount of 0.2 to 2.0% by mass (Examples 4 to 6), more satisfactory results were obtained, with the gas generation amount being smaller than 4.5 mL. On the other hand, in the battery with 2,4-diethyl-1,3-dithiethane-1,1,3,3-tetraone added in an amount of 5.0% by mass (Comparative Example 4), the gas generation amount was larger than 6.0 mL. This is thought to be because when the addition amount is excessively large, the cyclic disulfone compound excessively reacts with the negative electrode material, so that a large amount of gas is generated as the cyclic disulfone compound is decomposed.

In the batteries with 2-(methylethyl)-1,3-dithiethane-1,1,3,3-tetraone, 2,4-bis(methylethyl)-1,3-dithiethane-1,1,3,3-tetraone, 2-butyl-1,3-dithiethane-1,1,3,3-tetraone or 2,4-bis(butyl)-1,3-dithiethane-1,1,3,3-tetraone added in an amount of 1.0% by mass based on the total mass of nonaqueous electrolyte as a cyclic disulfone compound of the general formula (1) where R1 and R2 each represent hydrogen or an alkyl group having 2 to 4 carbon atoms, optionally including a halogen element (Examples 8 to 11), satisfactory results comparable to those in Example 1 were obtained. On the other hand, in the battery with a cyclic disulfone compound (where R1 and R2 each represent a methyl group) (2,4-dimethyl-1,3-dithiethane-1,1,3,3-tetraone) added in an amount of 1.0% by mass based on the total mass of the nonaqueous electrolyte (Comparative Example 5), the generation amount was larger than 6.0 mL. This is thought to be because when a cyclic disulfone compound where R1 and R2 each represent a methyl group is used, the reaction with the negative electrode material is insufficient, so that a strong protective film cannot be generated.

In Examples 12 to 18 in which various carbon materials were used for the negative electrode, satisfactory results were obtained with the gas generation amount being smaller than 6.0 mL. Particularly, in the batteries including hardly graphitizable carbon having average particle sizes of 2 μm and 25 μm respectively (Examples 13 and 14), satisfactory results comparable to those of Example 1 were obtained with the gas generation amount being smaller than 4.5 mL. Particularly, in the batteries including hardly graphitizable carbon having average particle sizes of 1 μm and 27 μm respectively (Examples 12 and 15), satisfactory results were obtained with the gas generation amount being smaller than 6.0 mL, but the gas generation amount was larger than 4.5 mL. This is thought to be because by using a carbon material having an average particle size of 2 to 25 μm, the negative electrode material and the cyclic disulfone compound were allowed to moderately react with each other, and by generating a stronger protective film, the gas generation amount was further reduced.

In the batteries with hardly graphitizable carbon-coated graphite included in the negative active material (Examples 16 and 18), satisfactory results comparable to those of Example 1 were obtained with the gas generation amount being smaller than 4.5 mL. On the other hand, in the battery using only natural graphite for the negative active material (Example 17), satisfactory results were obtained with the as generation amount being smaller than 6.0 mL, but the gas generation amount was larger than 4.5 mL. This is thought to be because by using amorphous carbon or a material whose surface was coated with amorphous carbon for the negative active material, reactivity between the surface of the negative electrode and the electrolyte solution was reduced, so that the gas generation amount was further reduced.

From the foregoing results, it has been found that in a nonaqueous electrolyte secondary battery which includes lithium iron phosphate as a positive active material and includes a cyclic disulfone compound of the general formula (1) in a nonaqueous electrolyte in an amount of 0.1 to 4.0% by mass based on the total mass of the nonaqueous electrolyte, generation of gas in the battery when the battery is used for a long period of time can be suppressed as compared to a nonaqueous electrolyte secondary battery including in the positive electrode an active material other than the aforementioned positive active material. It has also been found that when the negative active material included in the negative electrode includes hardly graphitizable carbon or a carbon material with the surfaces of particles coated with hardly graphitizable carbon, generation of gas in the battery when the battery is used for a long period of time can be considerably suppressed.

DESCRIPTION OF REFERENCE SIGNS

1 Nonaqueous electrolyte secondary battery
3 Positive electrode plate (positive electrode)
4 Negative electrode plate (negative electrode)
5 Separator
6 Battery case
7 Battery lid
10 Positive electrode lead
11 Negative electrode lead

The invention claimed is:

1. A nonaqueous electrolyte secondary battery comprising:
a positive electrode;
a negative electrode comprising a negative active material; and
a nonaqueous electrolyte,
wherein a positive electrode charge potential is 3.7 V or less with respect to a lithium metal potential,
the nonaqueous electrolyte includes a cyclic disulfone compound of a following general formula (1) in an amount of 0.2 to 2.0% by mass based on a total mass of the nonaqueous electrolyte:

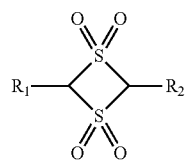

(1)

wherein R1 and R2 each represent hydrogen or an alkyl group having 2 to 4 carbon atoms, optionally including a halogen element,
the positive electrode includes lithium iron phosphate, and
the negative active material comprises amorphous carbon having a spacing on a (002) plane measured by X-ray wide angle diffractometry of 3.45 angstroms or more, the amorphous carbon having an average particle size of 2 to 25 μm.

2. The nonaqueous electrolyte secondary battery according to claim 1, wherein at least one of 2,4-diethyl-1,3-dithiethane-1,1,3,3-tetraone represented by the following formula (2), 2-(methylethyl)-1,3-dithiethane-1,1,3,3-tetraone represented by the following formula (3) and 2,4-bis(methylethyl)-1,3-dithiethane-1,1,3,3-tetraone represented by the following formula (4) is included as the cyclic disulfone compound

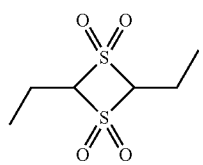

(2)

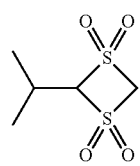

(3)

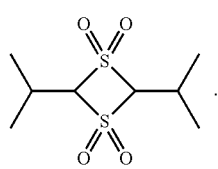

(4)

3. A method for producing the nonaqueous electrolyte secondary battery according to claim 1, the method comprising providing the positive electrode, the negative electrode, and the nonaqueous electrolyte in a battery case.

* * * * *